Figure 1:
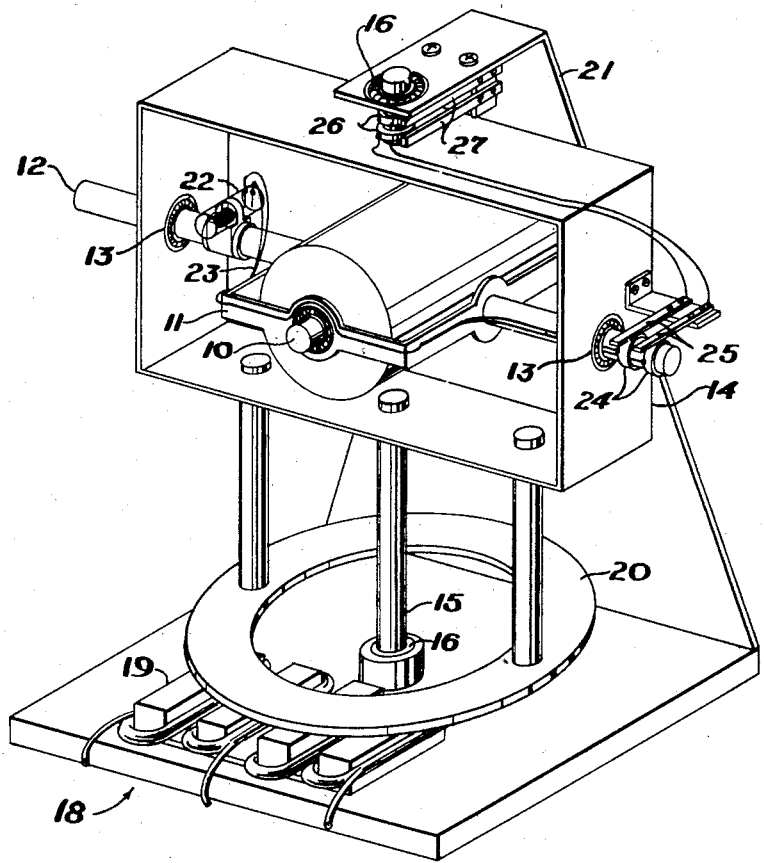

March 31, 1959  F. E. SCHULTE  2,879,671
GYROSCOPIC ERECTION SYSTEM
Filed Oct. 12, 1955  2 Sheets-Sheet 1

INVENTOR.
FREDRICK E. SCHULTE
BY
*Moody & Hatcher*
ATTORNEYS

INVENTOR.
FREDRICK E. SCHULTE
BY
ATTORNEYS

United States Patent Office 2,879,671
Patented Mar. 31, 1959

2,879,671

GYROSCOPIC ERECTION SYSTEM

Fredrick E. Schulte, Cedar Rapids, Iowa, assignor to Collins Radio Company, Cedar Rapids, Iowa, a corporation of Iowa Application October 12, 1955, Serial No. 540,024

9 Claims. (Cl. 74—5.47)

This invention relates in general to gyroscope erection systems. More particularly, this invention is concerned with the improvement of the control of gyroscope erection systems.

Prior art erection systems usually employed two gravity sensitive switches mounted on the inner gimbal of the gyroscope to sense and orient the position of the gimbal relative to gravity. The usual form of switch arrangement prior to this invention consisted of two single circuit mercury switches mounted on the inner gimbal and connected electrically to control one or the other direction sense of an erection motor operating on an axis normal to the desired erection axis of the gyro mounting. With this type of switching arrangement there was necessarily a dead zone between actuations in the two directions. There was also considerable mass, both fixed and movable, mounted on the inner gimbal. The extreme weight of the mercury in these switches is considered a source of error and a cause of undesirable precession. In actual practice the drift of a gyro was usually fairly high, rendering them less reliable after a number of hours from the original time of erection or orientation. The drift is most severe in the "free" directional gyro types.

Accordingly, it is an object of this invention to provide a gyro erection system which causes less undesirable precession than prior art gyro devices.

It is an object of this invention to produce a system which maintains more accurate erection of the gyro and does so with less drift resulting from the erection system components and the operation of the erection system.

It is a further object of this invention to employ a single switch operating through its on-off differential in place of prior art devices which must necessarily use the larger differential existing between the closed conditions of two separate switches.

A further object is to eliminate as much weight from the gimbals as possible, especially variable, for improvement in stability of the gyro.

Yet another object is to simplify the control circuit, reducing weight and sources of faults or troubles.

The present invention relates to a gyro erection system having a single gravity sensitive switch mounted on the innermost gimbal of the gyro and a torque motor coupled to apply a torque to said gyro so as to cause precession opposite to the erection error. One feature of the use of a single switch is simplification of the circuit.

Another feature of the invention is simplification of the control leading to more reliable operation under adverse conditions.

Another feature is a reduction of the amount of variable mass in the form of liquid mercury found in the usual gravity sensitive switch.

Another feature is that the dead zone or differential between one state and another of operation of the erection system is much smaller with a desirable result of a more accurate control. Actual flight testing of this system shows a considerably more accurate maintenance of the gyro's position and orientation than prior art devices.

Figure 2:
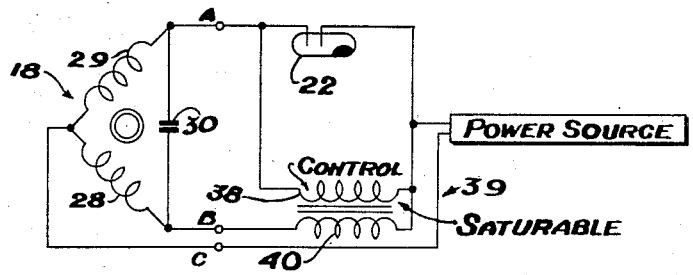
Figure 3:
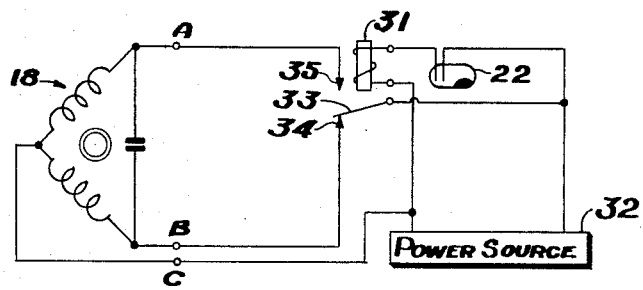
Figure 4:
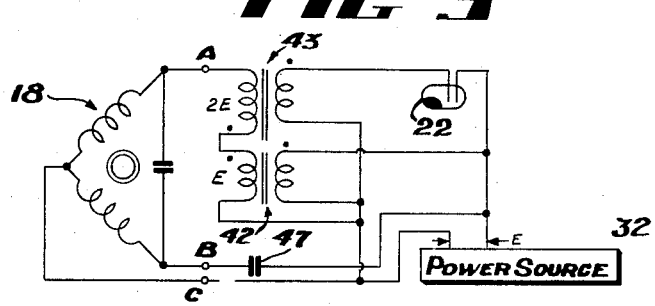
Figure 5:
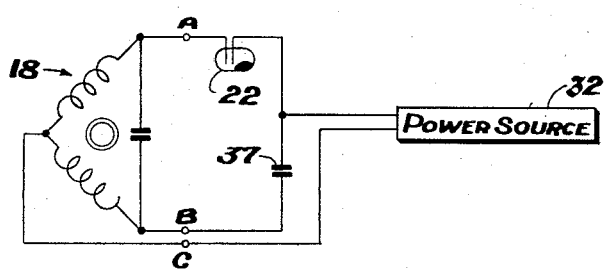
Figure 6:
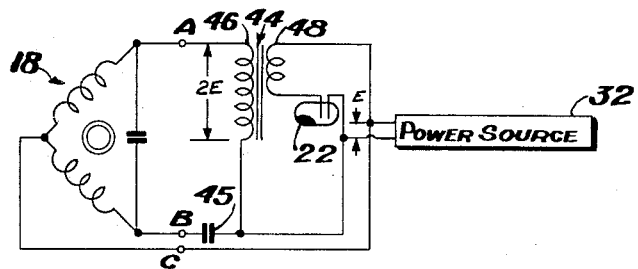

Further objects, features, and advantages of the invention will become apparent from the following description and claims when read in conjunction with the drawings, in which:

Figure 1 shows a mechanical arrangement illustrating a single pole switch mounted on a simple free gyro in accord with the invention, Figure 2 shows a saturable reactor type of control system for the erection motor, Figure 3 shows a circuit diagram embodying one possible form utilizing a relay in the control of the erection motor, Figure 4 shows one form of transformer circuit for exciting the erection motor, Figure 5 shows one of the simplest forms for exciting the erection motor made possible by the invention, and Figure 6 shows another form of transformer circuit for exciting the erection motor.

Figure 1 shows a simple gyroscope system. The gyroscope rotor 10 is mounted so as to rotate freely and is arranged to be driven at high speeds by means well known in the art and therefore not shown. Rotor 10 is mounted in a gimbal 11 which is pivotally mounted by means of shaft 12 in bearings 13. Gimbal 11 also turns freely and is mounted so as to have the least possible friction in its bearings. Bearings 13 are held in a gimbal 14 which is mounted on shaft 15. In this rudimentary form of gyroscope, shaft 15 is the ultimate mounting which supports the entire system in bearings 16. Bearings 16 are mounted indirectly on the airplane or such other vehicle utilizing this gyro; the mounting shown here is a C-shaped mounting 21, "skeletonized" for ease of presentation.

Torque motor 18, consisting of inductor ring 20 and magnetic driving coil system 19, is mounted rigidly on gimbal 14 and the mounting means 21, respectively. Torque motor 18 is in actuality a two-phase induction motor. The coil system 19 is excited by two phase currents to produce a magnetic field similarly to well known induction motor principles. This magnetic field induces a similar field in rotor ring 20 to cause a torque about shaft 15. Torque motor 18 is small and light but furnishes sufficient torque to keep the gyro rotor 10 erect through the phenomenon of precession. This torque, as applied to the gyro, may be expressed as a vector which is coexistent with shaft 15, and of a direction in accord with the rotational sense of the applied torque.

Gravity sensitive switch 22 is a switch which is actuated by or responds to, gravity. One example of this type is the mercury switch having a closed container, with contacts and liquid mercury therein. The liquid seeks the lowest part of the container; the contacts are placed so as to be short circuited by said mercury at some position as said switch is rotated in a plane. Switch 22 is mounted on shaft 12 so that the switch is positioned in the off-on differential area of its characteristic when shaft 12 is properly oriented relative to gravity.

Switch 22, by its mounting on shaft 12, will move in a plane which will include a plumb line showing the direction of gravity. This plane of motion is perpendicular to the axis of rotation of shaft 12. A vector representing the erection error (which this motion is, from the desired erect position) would be coexistent with the rotation of shaft 12, with heading in accord with the sense of the error. The off-on differential area of switch 22 is established with relation to the axis of rotation of rotor 10 so as to maintain rotor 10 in the desired direction. The angular momentum of rotor 10 may be expressed as a vector which is coexistent with the axis of rotation of rotor 10; with a direction according to the sense of said momentum. In Figure 1, rotor 10 is shown in a horizontal position, but it may have any arbitrary direction and will be kept in that orientation once switch 22 is mounted in the desired orientation relative to that direction.

For a vertical rotor, for example, one may use a single switch as above in each gimbal axis, with the accompanying erection motor properly related to said switch to correct the erection error sensed by said switch. This relation is that the correction torque vector must be approximately at right angles to the plane defined by the vectors of the rotor angular momentum and the erection error.

The electrical circuit between switch 22 and the first slip rings 24 comprise wires 23, connecting said switch to slip rings 24. Brushes 25 ride on rings 24 and are mounted on gimbal 14; they are connected to rings 26 which couple the switch circuit through the motion of shaft 15. Brushes 27 ride on slip rings 26 and provide non-moving circuit points from which the usual form of wiring may be run. Brushes 27 are mounted on some mounting means common to that carrying bearings 16, such as frame 21.

In Figure 2, a torque motor 18 with two field coils 28 and 29 and phasing condenser 30 is shown. This motor is similar to that in the rest of the figures; consequently it will be described in detail here only. The two field coils and the phasing condenser are connected into a delta, giving three terminals. The terminal C to which the two field coils are connected might be considered a "midpoint," since this terminal is between the two inductive elements. The terminals A, B to which the ends of a field coil and the phasing condenser 30 are connected might well be called "phase connections," since the voltages on these two terminals have definite relative phase, taking the "midpoint" as a reference point. Connection of a source of alternating current directly to either of the two "phase connections" and to the "midpoint" of the field coils will cause torque motor 18 to operate. The direction of operation is determined by the relative phases of the currents in the field windings. Here, one field winding is excited directly and the other out of phase through condenser 30 to give a two-phase operation in a manner well known in the motor art.

The control system of Figure 2 utilizes a saturable core impedance device. Here switch 22 connects a terminal of the power source directly to one phase connection, A, of torque motor 18. The other terminal of the power source, an alternating voltage, is applied to the midpoint, C, of torque motor 18. Shunting switch 22 is a control winding 38 of electromagnetic device 39. This device is also known as a saturable reactor. That is to say, current in the control winding, 38, will saturate the core, thereby lowering the impedance of the variable impedance winding 40. When the control winding is not excited the variable impedance winding 40 has a relatively high impedance. For even high power applications an impedance range of ten to one is possible giving thereby a current control range of ten to one.

The other phase connection, B, of torque motor 18 is supplied current from the same terminal of the power source as switch 22 through the variable impedance winding 40.

In operation, the closure of switch 22 short-circuits control winding 38, prevents current from flowing therethrough, and lets operating current flow to phase connection A. The lack of current in winding 38 consequently allows the impedance of variable impedance winding 40 to rise. Concurrently the previous operating current to phase connection B is reduced by the increased impedance of winding 40 to a value well below the operating value. Motor 18 will run in one direction.

When switch 22 opens, the current to phase connection A decreases radically since the control winding 38 conducts only a relatively low current, insufficient to energize motor 18. This current through winding 38 then saturates the core. The impedance of winding 40 is lowered as a consequence of saturation, allowing a relatively high current to pass through winding 40 to phase connection B. This relatively high current is sufficient to energize motor 18. This new current relation will reverse the direction of the running motor from that caused by the closed state of switch 22.

The motor is thus excited by currents of operating amplitude appearing at either A or B phase connections and rotating in a direction in accord therewith. Switch 22 controls the current in accordance with its relation to gravity as mentioned earlier.

While it would appear that this type of system is oscillatory in nature with results of undesirable, continued precession, continual motion, and undue wear, the inertia of the gyro and the electrical circuit components act to damp out and prevent oscillation.

The control system of Figure 3 includes a relay 31 which is connected by switch 22, when closed, to power source 32. Whenever switch 22 is closed, relay 31 is operated to move its arm 33 against contact 35. De-energized, relay 31 allows arm 33 to rest against contact 34. Phase connections A, B are connected to contacts 35, 34, respectively. In this manner relay 31 controls the application of power to phase connections A, B of torque motor 18 in a sense in accord with the condition of switch 22. The output torque of torque motor 18 is so sensed that when switch 22 closes and causes operation of torque motor 18 through contact 35 to move the gyro, precession of rotor 10 will cause gimbal 11 to turn in a direction to cause switch 22 to open again. When switch 22 opens relay 31 will release and torque motor 18 will be excited by current through contact 34. This will cause the torque motor to reverse its direction of output torque and cause a precession in the opposite direction.

Figure 4 shows a transformer arrangement for reversing the phase of the driving voltage applied to one phase connection, thereby reversing the direction of rotation of torque motor 18. In Figure 4 phase connection B is excited relative to midpoint C through capacitor 47 by the operating voltage of the motor; here power source 32 is illustrated as E. Phase connection A is excited by a controlled driving voltage. This driving voltage, also of amplitude E, for one direction of rotation of motor 18, is solely the secondary voltage of transformer 42. The primary of transformer 42 is excited by the power source 32. The secondary circuit of transformer 43 generates a voltage double that of the voltage generated by the secondary of transformer 42, or 2E. This second voltage is 180° out of phase from the output voltage of transformer 42. The two secondaries are connected in series to provide a reversible source voltage for phase connection A.

When switch 22 closes the primary circuit of transformer 43 is also connected to power source 32. With both transformers energized, the two secondary voltages add up to be the same amplitude (E) but 180° out of phase. This reverses the direction of rotation of motor 18. The secondary windings of transformers 42 and 43 may have their impedances adjusted relative to capacitor 47 to control undesirable phase shifts in a manner well known in the art.

Figure 5 shows possibly the simplest and lightest arrangement according to the invention. Torque motor 18 and its connections are the same as in Figure 2. Switch 22 connects phase connection A of torque motor 18 directly to the power source 32. Condenser 37 connects phase connection B of torque motor 18 to the same terminal of power source 32 to conduct current regardless of the condition of switch 22. Condenser 37 necessarily has a low enough reactance to conduct sufficient alternating current to actuate the torque motor when switch 22 is open circuited, yet it is not of such low reactance as to be a "short circuit" and conduct current of as great a magnitude as switch 22 when closed.

The operation of Figure 5 is similar to that of Figure 2.

with switch 22 open circuited. Torque motor 18 is excited by the current through capacitor 37 to run in one direction. This direction must be in the direction which will cause precession of gimbal 11 so as to close switch 22. Upon closing, switch 22 provides a direct connection to the opposite phase connection of motor 18. This reverses the direction of output torque of motor 18. The resultant precession then will move switch 22 to open the circuit. The cycle then repeats, of current through condenser 37 exciting motor 18 to run in the first mentioned direction. While this arrangement would seem to result in an oscillatory state the extremely high inertia of rotor 10 and the mechanism of the phenomenon of precession apparently damp out any oscillation. Actual flight use of this embodiment of the invention disclosed no discernible mechanical oscillation.

Figure 6 shows another form of transformer control circuit. In this form phase connection A is connected in series with the secondary 46 of transformer 44 to one terminal of power source 32. Phase connection B is connected in series with phase shift capacitor 45 to the same power source terminal. The reactances are adjusted to permit proper operation in one direction. Midpoint C is connected to the other terminal of power source 32. The primary of transformer 44 is connected through switch 22 to power source 32. The output voltage amplitude and phase of secondary 46 is adjusted to reverse the polarity of the voltage appearing at phase connection A when the primary 48 is energized by power source 32. When switch 22 closes, this voltage phase reversal reverses the direction of rotation of torque motor 18. The operation of this circuit is similar in nature to that of Figure 4 in the use of a voltage of twice the exciting voltage amplitude to overcome and reverse the exciting voltage polarity.

The invention using gravity or position sensitive switches may be used equally well in vertical and directional gyros as well as the horizontal gyro as described here. While the disclosure shows the erecting system used with a free gyro, the erecting system may be applied to limited motion gyros also. Other gyro systems requiring gyros operated in a fixed orientation may utilize this system provided the orientation can be related to a single switch such as switch 22. It is obvious that other means than saturable transformer or transformer systems may be used in the control circuit. Electronic or magnetic amplifiers of the phase sensitive type may be used. These amplifiers would excite one or the other phase connection of motor 18 in accord with the state of switch 22. Of course, the reversible rotation control feature may be used in motor control circuits generally.

Although this invention has been described with respect to particular embodiments thereof, it is not to be so limited because changes and modifications may be made therein which are within the full intended scope of the invention as defined by the appended claims.

I claim:

1. A free gyro erection system comprising a free gyro having a motor mounted in a gimbal, said gimbal rotatable in a plane about a desired position, a position sensitive single circuit switch mounted on said gimbal and having two states, open and closed, the operating point of said switch between said two states being oriented relative to said desired position of said gyro, a bi-directional torque means coupled to said gyro so as to rotate said rotor and gimbal approximately at right angles to the axes of rotation of said rotor and said gimbal, said torque means having a pair of phase connections, and means connecting said torque means to an alternating supply, said last-named means including a reactance and said switch each connected to said phase connections so that said torque means may be energized to rotate in a direction in accord with the state of said switch whereby the torque applied to said rotor causes it to reposition by a precession of said rotor into approximately said desired position and change said switch to its other state.

2. A free gyro erection system comprising a free gyro having a rotor mounted in gimbals and positioned in a desired attitude, a torque motor connected to an outer gimbal so as to apply a torque approximately perpendicular to the axes of rotation of said rotor and of a gimbal mounting said rotor, a gravity sensitive single circuit switch having two electrical states, open and closed, mounted on said gimbal, with its two states oriented relative to said rotor in its desired position, and inductive coupling means including said torque motor and said switch so that said torque motor may be energized to operate in one direction when said switch is closed and in the opposite direction when said switch is open, the torque of said torque motor operating with said switch in one state in such direction as to cause a precession of said rotor which will change said switch to its other state.

3. A gyro positioning system comprising a gyro having a rotor mounted in gimbals and positioned in a desired attitude, a torque motor connected to an outer gimbal so as to apply a torque substantially perpendicular to the axes of rotation of said rotor and of the innermost gimbal mounting said rotor, a position sensitive switch having two electrical states, open and closed, mounted on said innermost gimbal, and oriented to be between its two states when said rotor is in its desired position, and reactance coupling means including said position sensitive switch connecting said torque motor to an alternating supply so that said torque motor is energized to operate in one direction when said switch is closed and in the opposite direction when said switch is open, the torque of said torque motor operating with said switch in one state in such direction as to cause a precession of said rotor which will change said switch to its other state.

4. A motor control system having a reversible two-phase motor comprising a two-phase motor having a pair of phase connections, power supply terminals, a saturable reactor in series with one of said terminals and one of the pair of phase connections, a single circuit switch in series between the same terminal and the other one of the pair of phase connections, said reactor being controlled by said switch to conduct operating current for said motor when said switch is open.

5. A motor control system for a reversible phase motor comprising a two-phase motor having a midpoint terminal and a pair of phase connections, a switch having two states, open and closed, a saturable reactor having a control winding and a variable impedance winding, first and second terminals adapted for connection to a power source, the midpoint terminal of said motor being connected to said first terminal, one side each of said switch, of said control winding and of said impedance winding being connected to said second terminal, the other side of said switch and said control winding being connected to one phase connection, and the other side of said impedance winding being connected to the other phase connection, whereby change of said switch from one state to another will reverse the direction of said motor.

6. The motor control system of claim 5 wherein said switch comprises a gravity sensitive switch mounted on a gyro gimbal and wherein said motor precesses said gyro according to the condition of said switch to maintain said switch between its closed and open states.

7. A motor control system for a reversible phase motor comprising a two-phase motor having a pair of phase connections and a midpoint terminal, a pair of terminals adapted to be connected to alternating current, the midpoint terminal of said motor being connected to one of said terminals, one of said phase connections being connected to the other of said terminals through a reactance, the other of said phase connections being connected to said other terminal in series circuit through the output of transformer means, a single circuit switch having two states, open and closed, and connection between said other terminal through said switch to said transformer means whereby direction of said motor rotation is controlled by the state of said switch.

8. A motor control system for a reversible phase motor comprising a two-phase motor having a midpoint terminal and a pair of phase connections, the power source terminals, one of which is connected to a midpoint terminal of said motor, the other power terminal being connected to one of said phase connections through a reactance, a pair of transformers, one having output voltage equal to the power source, the other having output voltage double that of said power source, said outputs being connected in series opposing, the other of said phase connections being excited by the output voltages of said transformers, and a single circuit switch connected in the primary circuit of said double voltage transformer to energize said transformer.

9. A motor control system for a reversible phase motor comprising a two-phase motor having two terminals to which the phasing of alternating current determines the direction of rotation of said motor, a power source terminal, a reactance means connected between one of said terminals and said power source terminal, a transformer having a primary and a secondary with an output voltage of twice that of said power source and phase opposite to said power source, said secondary winding being connected between said power source terminal and said other terminal and a single circuit switch connected in series with the primary of said transformer whereby closure of said switch causes the output voltage of said transformer to reverse the phase of the voltage applied to said other terminal thereby reversing the direction of motion of said motor.

References Cited in the file of this patent

UNITED STATES PATENTS

| | | |
|---|---|---|
| 2,437,064 | Andresen | Mar. 2, 1948 |
| 2,559,094 | Schuck | July 3, 1951 |
| 2,586,469 | Kuyvenhoven | Feb. 19, 1952 |
| 2,645,942 | Hurlburt et al. | July 21, 1953 |
| 2,713,134 | Eckweiler | July 12, 1955 |
| 2,745,091 | Leffler | May 8, 1956 |
| 2,745,288 | Konet et al. | May 15, 1956 |